(12) United States Patent
Sanderson et al.

(10) Patent No.: US 7,837,768 B2
(45) Date of Patent: Nov. 23, 2010

(54) SYSTEM AND METHOD FOR PURIFYING AN AQUEOUS STREAM

(75) Inventors: Larry D. Sanderson, Roswell, GA (US); James W. Schleiffarth, Midway, UT (US); Leslie D. Merrill, Bountiful, UT (US); Bradford M. Rohwer, Bountiful, UT (US)

(73) Assignee: General Electric Capital Corporation as Administrative Agent, Stamford, CT (US)

( * ) Notice: Subject to any disclaimer, the term of this patent is extended or adjusted under 35 U.S.C. 154(b) by 1 day.

(21) Appl. No.: 12/199,777

(22) Filed: Aug. 27, 2008

(65) Prior Publication Data

US 2009/0078652 A1     Mar. 26, 2009

Related U.S. Application Data

(60) Provisional application No. 60/968,284, filed on Aug. 27, 2007.

(51) Int. Cl.
*B01D 19/00* (2006.01)

(52) U.S. Cl. .............. 95/158; 95/14; 95/166; 95/186; 95/204; 95/243; 95/251; 95/258; 95/259; 96/156; 96/173; 96/181; 96/218; 96/243; 165/108; 210/85; 210/103; 210/134; 210/149; 210/180; 210/182; 210/195.1; 210/259; 210/743; 210/758; 210/774; 210/805; 210/806; 202/161; 202/182; 202/185.1; 202/197; 203/28; 203/39; 208/187

(58) Field of Classification Search .............. 202/82, 202/152, 161, 182, 185.1, 197; 203/1–3, 203/10, 31, 39, 42, 88, 89, 98; 210/669, 210/739, 742, 743, 744, 758, 763, 767, 774, 210/806, 85–87, 90, 103, 104, 134, 137, 210/143, 149, 167.32, 180–182, 188, 194, 210/195.1, 192, 258, 259, 741, 748, 805; 166/266, 267; 175/66, 206, 207; 95/14–19, 95/23, 24, 149, 156–159, 165, 166, 178–180, 95/187, 188, 204, 223–228, 241–245, 251, 95/254–259, 263, 186; 96/156, 157, 173, 96/174, 182–185, 193, 201, 218, 234, 235, 96/242–245, 251–253, 417–421, 181; 208/187; 165/108

See application file for complete search history.

(56) References Cited

U.S. PATENT DOCUMENTS

| | | | |
|---|---|---|---|
| 3,625,886 A * | 12/1971 | Mattia | 210/673 |
| 3,923,644 A * | 12/1975 | Hindman | 208/186 |
| 4,341,636 A | 7/1982 | Harder et al. | |
| 4,539,076 A | 9/1985 | Swain | |
| 4,594,131 A * | 6/1986 | Maier | 203/26 |
| 4,834,889 A | 5/1989 | Schleiffarth | |
| 5,587,054 A * | 12/1996 | Keith | 202/182 |
| 5,645,694 A | 7/1997 | Stewart et al. | |
| 6,015,496 A | 1/2000 | Khudenko | |
| 6,217,711 B1 | 4/2001 | Ryham et al. | |
| 6,355,145 B1 | 3/2002 | Kresnyak et al. | |
| 6,365,005 B1 | 4/2002 | Schleiffarth | |
| 6,536,523 B1 | 3/2003 | Kresnyak et al. | |
| 6,551,466 B1 | 4/2003 | Kresnyak et al. | |
| 6,849,175 B2 * | 2/2005 | Kresnyak | 208/187 |
| 6,944,522 B2 | 9/2005 | Karmiy et al. | |
| 6,984,292 B2 | 1/2006 | Kresnyak et al. | |
| 7,002,140 B2 | 2/2006 | Elsegood et al. | |
| 2003/0127400 A1 | 7/2003 | Kresnyak et al. | |
| 2004/0206681 A1 | 10/2004 | Gordon | |

| | | |
|---|---|---|
| 2007/0051513 A1 | 3/2007 | Heins |
| 2007/0102359 A1* | 5/2007 | Lombardi et al. ............ 210/639 |
| 2009/0032446 A1 | 2/2009 | Wiemers et al. |

OTHER PUBLICATIONS

PCT/US08/74516 International Search Report and Written Opinion, Nov. 19, 2008.
PCT/US08/74518 International Search Report and Written Opinion, Nov. 17, 2008.
PCT/US08/74516 International Preliminary Report on Patentability, Apr. 20, 2010.
PCT/US08/74518 International Preliminary Report on Patentability, Mar. 22, 2010.
USPTO Office Action, U.S. Appl. No. 12/199,779, dated Dec. 9, 2009.

* cited by examiner

*Primary Examiner*—Joseph W Drodge
(74) *Attorney, Agent, or Firm*—Kunzler Needham Massey & Thorpe

(57) ABSTRACT

A system and method are disclosed for purifying a waste fluid stream. The system includes a recirculation pump having an inlet for a recirculation stream and an outlet to expel a pressurized stream. The system includes a compressor having an inlet for an evaporation stream and an outlet for a pressurized evaporation stream. A primary heat exchanger has inlets for the pressurized stream and the pressurized evaporation stream, an internal surface area for heat transfer from the evaporation stream to the pressurized stream, and outlets for a cooled product stream and a heated pressurized stream. The heated pressurized stream is formed by heating the pressurized stream and the cooled product stream is formed by cooling the evaporation stream. The system includes an evaporation unit having an inlet for the heated pressurized stream and outlets for an evaporation stream and the recycled liquid bottoms stream.

47 Claims, 4 Drawing Sheets

SYSTEM AND METHOD FOR PURIFYING AN AQUEOUS STREAM

CROSS-REFERENCES TO RELATED APPLICATIONS

This application claims the benefit of U.S. Provisional Patent Application No. 60/968,284 entitled "APPARATUS, SYSTEM, AND METHOD FOR PURIFYING AN AQUEOUS STREAM" and filed on Aug. 27, 2007, for Larry D. Sanderson, et. al which is incorporated herein by reference. The application incorporates by reference U.S. Provisional Application Ser. No. 60/968,285 filed Aug. 27, 2007.

BACKGROUND OF THE INVENTION

1. Field of the Invention

This invention relates to waste stream purification, and more particularly relates to purification of waste streams containing contaminants typically found in oilfield and industrial applications.

2. Description of the Related Art

Water is often used for various tasks in the oil and gas production and other industrial operations. For example, water may be injected into an oil well to repressurize a reservoir, and water may be pumped from a well in the process of extracting oil or gas. As another example, water may used to deliver proppants to underground fractures. Due to environmental concerns, contaminated water cannot simply dumped on the ground or pumped back into wells. The requirement to treat contaminated water sources presents an additional operation and expense for oil and gas well owners and operators.

Treating waste water typically involves one or more unit operations, such as distillation or filtration. Distillation is an energy-intensive process that frequently requires large distillation columns. Filtration may require frequent filter changes to keep the system operating at the desired contaminant removal levels. The oil or gas producer must have personnel on hand to operate the waste water treatment unit operations, and must have the required energy and materials available to process the produced waste water. All of these constraints cost money and increase the cost of oil and gas production.

SUMMARY OF THE INVENTION

From the foregoing discussion, it should be apparent that a need exists for a system and method for purifying an aqueous stream. Beneficially, such a system and method would provide oil and gas producers a more efficient way to process waste water. Such a system and method would provide a source of clean water for use in further well operations, for human and agricultural needs, or for reinjection into the ground. Further, such a system and method could be used to process waste water in settings other than the petroleum industry. The system and method could be used when circumstances call for a self-contained, energy-efficient purification system.

In one embodiment, the invention is a system to purify a waste fluid stream. The system includes a recirculation pump having an inlet for a recirculation stream and an outlet to expel a pressurized stream. The recirculation stream includes a waste fluid stream and a recycled liquid bottoms stream. The system also includes a compressor having an inlet for an evaporation stream and an outlet for a pressurized evaporation stream. The system further includes a primary heat exchanger. The primary heat exchanger has inlets for the pressurized stream and the pressurized evaporation stream, an internal surface area for heat transfer from the evaporation stream to the pressurized stream, and outlets for a cooled product stream and a heated pressurized stream. The heated pressurized stream is formed by heating the pressurized stream and the cooled product stream is formed by cooling the evaporation stream. The system further includes an evaporation unit having an inlet for the heated pressurized stream and outlets for an evaporation stream and the recycled liquid bottoms stream. The evaporation stream is formed when volatile compounds in the heated pressurized stream evaporate in the evaporation unit. The liquid bottoms stream is formed from a portion of the heated pressurized stream that does not evaporate.

In certain embodiments, the system further includes a stripping unit that receives the evaporation stream from the primary heat exchanger. The stripping unit typically includes a stripping vessel, a stripper recycle pump, a reboiler, a condensing unit, and at least one valve. The stripping vessel includes inlets for the cooled product stream, a recycled bottoms stream, and a stripper reflux stream and outlets for a stripper vapor outlet stream and a stripper bottoms stream. The stripper recycle pump includes an inlet for the stripper bottoms stream and an outlet for the recycled bottoms stream. The reboiler includes inlets for the recycled bottoms stream and a heat transfer fluid. The reboiler has an internal surface area for heat transfer from the heat transfer fluid to the recycled bottoms stream.

The condensing unit has an inlet for the stripper vapor outlet stream and outlets for a volatile fractions stream, a non-condensable stream, and the stripper reflux stream. The stripper reflux stream returns to the stripping vessel. The at least one valve has an inlet for the recycled bottoms stream and at least two outlets, wherein one outlet comprises a final product stream port.

In a further embodiment, the condensing unit includes a primary condenser. The primary condenser has inlets for the stripper vapor outlet stream and a first coolant stream, has an internal surface area for heat transfer from the stripper vapor outlet stream to the coolant stream, and has outlets for a cooled stripper vapor stream and a spent coolant stream. The condensing unit also includes a collection vessel that has inlets for the cooled stripper vapor stream and a liquid return stream and outlets for a collection vapor stream and a condensed stream.

The system may further include a secondary condenser. The secondary condenser may have inlets for the collection vapor stream and a second coolant stream, an internal surface area for heat transfer from the collection vapor stream to the second coolant stream, and outlets for a non-condensable stream, the liquid return stream, and a spent coolant stream. The liquid return stream may include a fraction of the collection vapor stream that condenses in the secondary condenser. The non-condensable stream may include a fraction of the collection vapor stream that does not condense in the secondary condenser. The system may include a splitter valve having an inlet for the condensed stream and outlets for the stripper reflux stream and the volatile fractions stream.

The system may have a ratio of the flow rate of the stripper reflux stream to the sum of the flow rates of the volatile fraction stream and the non-condensable stream between 1 and 200. The system may have a ratio of the flow rate of the stripper reflux stream to the sum of the flow rates of the volatile fraction stream and the non-condensable stream between 10 and 50. The system may have a ratio of the flow rate of the stripper reflux stream to the sum of the flow rates of the volatile fraction stream and the non-condensable stream of approximately 20.

The system may also include a steam control unit that provides backpressure to keep the cooled product stream in a liquid phase. The steam control unit typically includes a steam trap having an inlet for the cooled product stream from the primary heat exchanger and an outlet for a condensed distillate stream, a storage vessel having an inlet for the condensed distillate stream and outlets for a vapor vent stream and a liquid stream, a pump having an inlet for the liquid stream and an outlet to the stripping unit, and a vent having an inlet for the vapor vent stream and an outlet to the stripping unit.

In certain embodiments, the steam control unit provides condensed steam to the stripping vessel and the vapor vent stream from the storage vessel is introduced to the stripping vessel below a distribution tray. The steam control unit may provide backpressure to keep the cooled product stream in a liquid phase. The steam control unit may include a separator having an inlet for the cooled product stream from the primary heat exchanger and a outlets for a liquid stream and a vapor vent stream, a pump having an inlet for the liquid stream and an outlet to the stripping unit, and a vent having an inlet for the vapor vent stream and an outlet to the stripping unit. The steam control unit may provide the liquid stream to the stripping vessel and the vapor vent stream may be introduced to the stripping vessel below a distribution tray.

The system may further include an oxidizer unit. The oxidizer unit may include inlets for a product stream and an oxidizer, an outlet for an oxidized stream, and an ultrasonic vibration source. In another embodiment, the oxidizer unit may include an inlet for a product stream, an outlet for an oxidized stream, and an ultraviolet radiation source.

The system may include a secondary recovery heat exchanger having inlets for the waste fluid stream and a final product stream, having an internal surface area for heat transfer from the final product stream to the waste fluid stream, and having outlets for a cooled final product stream and a heated waste fluid stream.

The system may include an additives unit. The additives unit may include a pump having an inlet for additives and an outlet to the recirculation stream.

The primary heat exchanger is typically configured with an inlet and an outlet for a heat transfer fluid and with an internal surface area for heat transfer from the heat transfer fluid to the pressurized stream. The primary heat exchanger may transfer heat from the evaporation stream to the recirculation stream such that the cooled product stream is a liquid. A secondary recovery heat exchanger may have inlets for the waste fluid stream and a purge stream, an internal surface area for heat transfer from the purge stream to the waste fluid stream, and outlets for a cooled purge stream and a heated waste fluid stream.

The system may include an air-handling device. The air-handling device may have an inlet for the evaporation stream and an outlet to the primary heat exchanger. The air-handling device may be a blower.

The system may also include a separator that removes solid material and hydrocarbons immiscible in water from the waste fluid stream before the waste fluid stream joins the recirculation stream. The system may include a feed pump to deliver the waste fluid stream to the separator.

The system may include a final processing unit configured to remove remaining contaminants from the final product stream. The final processing unit may include a carbon adsorber.

The system typically includes a controller that receives one or more signals from sensors and sends one or more signals to actuators. The sensors may measure parameters selected from the group consisting of pressure, temperature, level, flow, density, and chemical composition. The actuators may be selected from the group consisting of electronic, hydraulic, and pneumatic manipulation of controlled physical components of the apparatus. The controlled physical components of the apparatus may be selected from the group consisting of valves, pumps, and blowers. The controller may include an operator interface.

The waste fluid stream may be contaminated oilfield process water. The ratio of the flow rate of the recirculation stream to the flow rate of the waste fluid stream may be between 50 and 500. In other embodiments, the ratio of the flow rate of the recirculation stream to the flow rate of the waste fluid stream is between 150 and 250. In a further embodiment, the ratio of the flow rate of the recirculation stream to the flow rate of the waste fluid stream is approximately 200.

In one embodiment, the invention is a system to purify a waste fluid stream. The system includes a recirculation pump, a compressor, a primary heat exchanger, an evaporation unit, a stripping vessel, a stripper recycle pump, a reboiler, a condensing unit, and a secondary recovery heat exchanger. The recirculation pump has an inlet for a recirculation stream and an outlet to expel a pressurized stream. The recirculation stream may include a waste fluid stream and a recycled liquid bottoms stream. The compressor may have an inlet for an evaporation stream and an outlet for a pressurized evaporation stream. The primary heat exchanger may have inlets for the pressurized stream, the pressurized evaporation stream, and a heat transfer fluid. The heat exchanger may transfer heat from the heat transfer fluid and from the evaporation stream to the pressurized stream.

The evaporation unit may have an inlet for the pressurized stream and outlets for an evaporation stream and the recycled liquid bottoms stream. The stripping vessel may have inlets for the evaporation stream, a recycled bottoms stream, and a stripper reflux stream and outlets for a stripper vapor outlet stream and a stripper bottoms stream. The stripper recycle pump may have an inlet for the stripper bottoms stream and an outlet for the recycled bottoms stream. The reboiler may have inlets for the recycled bottoms stream and a heat transfer fluid. The reboiler typically has an internal surface area for heat transfer from the heat transfer fluid to the recycled bottoms stream. The condensing unit may have an inlet for the stripper vapor outlet stream and outlets for a volatile fractions stream, a non-condensable stream, and the stripper reflux stream. The stripper reflux stream typically returns to the stripping vessel. The secondary recovery heat exchanger has inlets for the waste fluid stream and the final product stream. The heat exchanger typically transfers heat from the final product stream to the waste fluid stream.

In certain embodiments, the invention is a method to purify a waste fluid stream. The method may include joining a waste fluid stream with a pressurized stream, recirculating the pressurized stream through a primary heat exchanger and an evaporation unit, transferring heat from an evaporation stream to the pressurized stream, evaporating volatile compounds from the pressurized stream in the evaporation unit, and returning a portion of the heated pressurized stream that does not evaporate to the pressurized stream. The volatile compounds form the evaporation stream.

The method may further include introducing the evaporation stream into a stripping vessel, pumping the stripper bottoms stream from the stripping vessel through a reboiler and back to the stripping vessel, extracting a portion of the stripper bottoms stream as a product stream, heating the stripper bottoms stream in the reboiler, condensing a portion of the vapor outlet stream to form a stripper reflux stream and returning the stripper reflux stream to the stripping vessel. The evaporation stream typically separates into a vapor outlet stream and a liquid bottoms stream.

The method may include mixing a chemical oxidizer with the product stream. The method may include vibrating a mixture of the chemical oxidizer and the product stream with ultrasonic vibration. In some embodiments, the method includes irradiating the product stream with ultraviolet radiation. The method may include removing contaminants from the product stream by passing the product stream through a filter.

The method typically includes transferring heat from the product stream to the waste fluid stream. The method may include adding chemical additives to the pressurized stream. The method typically includes transferring heat from a heat transfer fluid to the pressurized stream. The method may include separating solid material and hydrocarbons immiscible in water from the waste fluid stream before the waste fluid stream joins the pressurized stream.

The method may further include receiving one or more signals from sensors and controlling one or more actuators. The sensors may measure parameters selected from the group consisting of pressure, temperature, level, flow, density, and chemical composition. The actuators may be selected from the group consisting of electronic, hydraulic, and pneumatic manipulation of controlled physical components of the apparatus. The controlled physical components of the apparatus may be selected from the group consisting of valves, pumps, and blowers.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
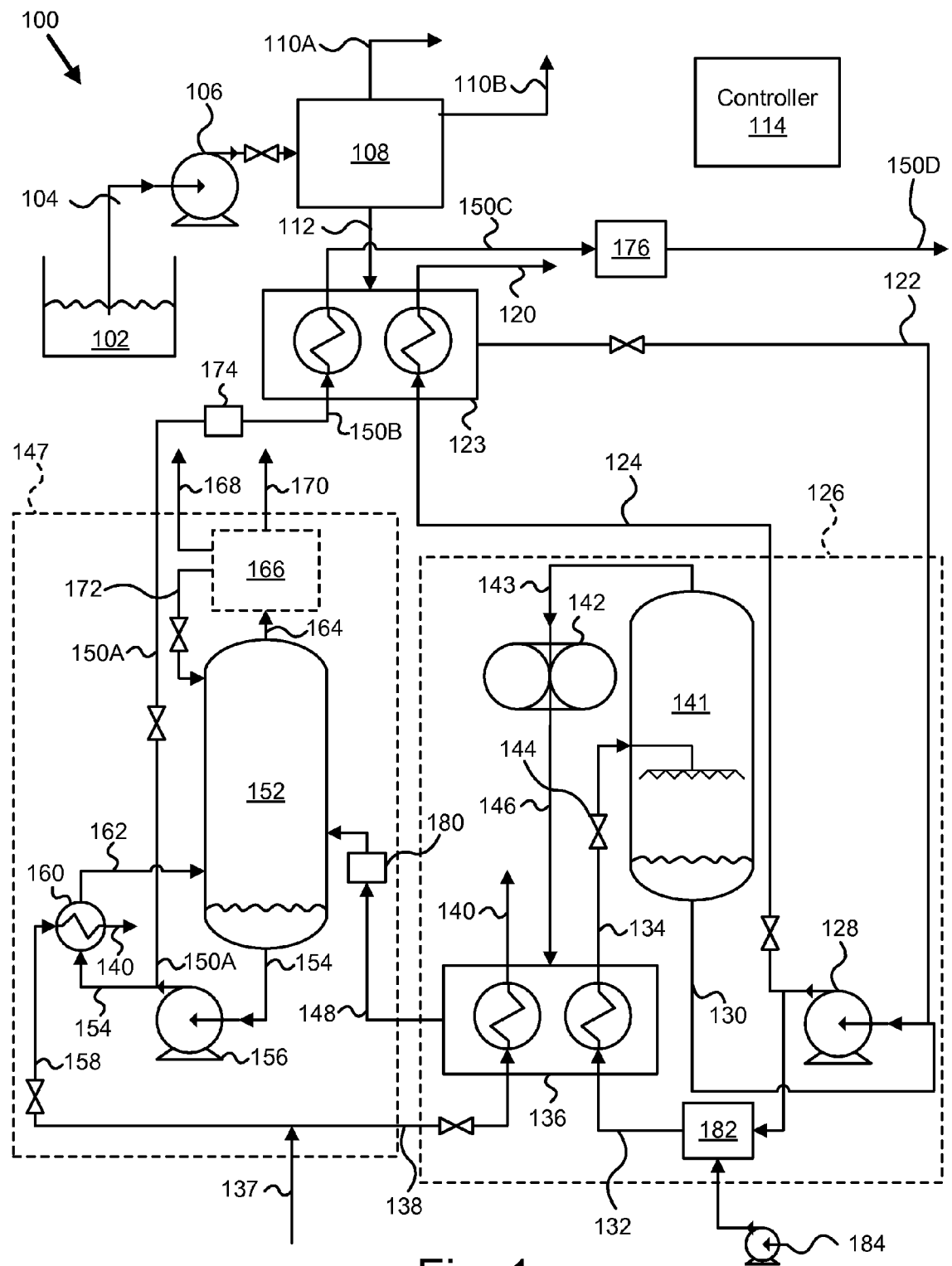
FIG. 1 is a schematic block diagram illustrating one embodiment of an system for purifying a waste stream in accordance with the present invention.

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 4, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

FIG. 1 is a schematic block diagram illustrating one embodiment of a system 100 for purifying a waste fluid stream in accordance with the present invention. The system 100 may include a feed tank 102 holding the waste fluid (e.g. waste water from an oilfield process) to be treated, although any other supply of waste fluid may be used. The waste fluid enters as a waste fluid stream 104 and is supplied by a feed pump 106 to a water-oil separator 108. The waste fluid stream 104 may be from any oilfield process, industrial process, landfill leachate, and/or naturally occurring water source.

The separator 108 may be a coalescing separator or any other separation mechanism to separate bulk oil from water, for example including a settling tank. The separator 108 may further perform liquid-solid separation, for example separating large solids such as proppant used to stimulate a well, or sands from a loosely consolidated formation. The separator 108 may include a wedge-wire self-cleaning pre-screen, a rotary screen filter, or other separation mechanism known in the art to perform the liquid-solid separation. The separated solids may leave the separator 108 as a solids waste stream 110A. Bulk oil (which may be any hydrocarbon or other low-density liquid immiscible in water) leaves the separator 108 as a liquid waste stream 110B and bulk water leaves the separator 108 as a feed stream 112. After the separator 108, the feed stream 112 comprises water with impurities, which may include methanol, other alcohols, hydrocarbon products and/or formation fluids from a well, various chemicals and fluids used to treat the well, and/or any other soluble or miscible fluids.

The system 100 may include a controller 114 that controls various temperatures, pressures, flow rates, fluid levels, and/or other system operating attributes that will become clear in various embodiments described herein. The controller 114 may be in communication with various sensors and actuators (not shown) depending upon the controls in a specific embodiment. The sensors may include pressures, temperatures, fluid levels, flow rates, densities, and/or other parameters of any stream or vessel. The actuators may include electronic, hydraulic, and/or pneumatic manipulation of any valves, pumps, blowers, and/or other physical components of the system 100. The controller 114 may be electronic (e.g. a computer with an electronic interface), mechanical (e.g. springs or the like to respond to various system parameters in prescribed ways), and/or may include a manual aspect (e.g. a sight gauge and a hand valve wherein an operator controls a tank level).

The feed stream 112 may be directed to a secondary recovery heat exchanger 123, which may be a shell-and-tube heat exchanger or other type of exchanger known in the art. The secondary recovery heat exchanger 123 transfers heat from one or more exiting streams that may have residual heat from the separation process of the system 100 to the feed stream 112 to create a pre-heated feed stream 122. The pre-heated feed stream 122 enters a separation unit 126 that removes impurities from the pre-heated feed stream 122. In one embodiment, the separation unit 126 is a mechanical vapor recompression unit. In the separation unit 126, the pre-heated feed stream 122 may be mixed with a concentrated bottoms stream 130, and fed through a recirculation pump 128. The recirculation pump 128 outlet may be split into a pre-recovery concentrated purge stream 124 and a recirculation stream 132. The pre-recovery concentrated purge stream 124 passes through the secondary recovery heat exchanger 123 and transfers residual heat to the feed stream 112 before exiting as a concentrated purge stream 120.

In one embodiment, the secondary recovery heat exchanger 123 heats the feed stream 112 after the separator 108 removes the solids waste stream 110A from the waste fluid stream 104, but before the separator 108 removes the liquid waste stream 110B from the waste fluid stream 104. The heating of the waste fluid stream 104 after solids 110A removal allows the secondary recovery heat exchanger 123 to avoid unnecessarily heating waste solids 110A, while providing some heat to assist in quickly separating the liquid waste stream 110B. In one embodiment, the separator 108 includes multiple stages and components to perform solid waste removal in one or more stages, and to perform liquid waste removal in one or more stages. The secondary recovery heat exchanger 123 is shown downstream of the separator 108, but may be upstream of the separator 108 and/or distributed between stages of the separator 108.

The separation unit 126 includes an evaporation unit 141 that provides the concentrated bottoms stream 130 to the recirculation pump 128. The evaporation unit 141 accepts a heated recirculation stream 134 that may be heated in a primary heat exchanger 136 by a steam inlet stream 138 tapped from a system steam inlet 137. For the purposes of a clear description, the heat inlet stream 137 is referred to as a system steam inlet 137, but the heat inlet stream 137 and related streams (e.g. 138, 140, 158) may comprise any heat inlet medium including heated glycol, heated oil, and/or other heat transfer media configured to deliver thermal energy from a heat source (not shown) to the heat exchangers 136, 158. The steam inlet stream 138 may leave the primary heat exchanger 136 as a cooled steam outlet 140. The recirculation stream 132 may further accept heat from a distillate stream 143 out of the evaporation unit 141 that is taken from the evaporation unit 141 by a blower 142 and passed through the primary heat exchanger 136.

The primary heat exchanger 136 may be a shell-and-tube heat exchanger with the recirculation stream 132 passing on the tube-side. Preferably, the recirculation stream 132 passes through the primary heat exchanger 136 in highly turbulent flow, increasing the heat transfer rate and reducing the amount of fouling in the primary heat exchanger 136. Alternatively, the primary heat exchanger 136 may be a plate and frame heat exchanger or another heat exchanging device known in the art.

In one embodiment, the primary heat exchanger 136 is configured to transfer the heat of vaporization from a charged distillate stream 146 to the recirculation stream 132, and also heat from a steam inlet stream 138 to the recirculation stream 132. The heat transfer may be staged such as first transferring the heat of vaporization from the charged distillate stream 146, then transferring the heat from the steam inlet stream 138. In one embodiment, the charged distillate stream 146 exits the primary heat exchanger 136 as a condensed distillate stream 148 at a temperature just below the boiling point of the condensed distillate stream 148. The primary heat exchanger 136 may be designed to deliver the condensed distillate stream 148 at a specified temperature and/or at a specified pressure, and one of skill in the art recognizes the selection of the specified temperature and/or specified pressure affects the final pressure and/or temperature of the condensed distillate stream 148.

In the prior art, mechanical vapor recompression recirculation system have recirculation ratios from below about 25 to about 200. The recirculation ratio is defined as the mass flow of recirculation stream 132 divided by the mass flow of the distillate stream 143. In the present invention, recirculation ratios in the range from below 25 to about 200 are useful when combined with other features of the present invention. Waste fluid streams 104 with low thermal conductivity, specific heat and/or a high tendency to foul in the primary heat exchanger 136 indicate higher recycle ratios. The economics of pumping losses and potential sub-cooling of the charged distillate 146 in the heat exchanger 136 indicate lower recycle ratios. The use of the steam-stripping system 147 and other novel aspects of the present invention allow recycle ratios of 200-300 or greater where the upper economic limit was about 200 times in the prior art, although other aspects of the present invention also differ from the prior art. The heated recirculation stream 134 may pass into the evaporation unit, possibly through an orifice 144 near the evaporation unit 141 entrance such that the heated recirculation stream 134 flashes into the evaporation unit 141. The orifice 144 is designed to enhance the flash effect of the heated recirculation stream 134. The orifice 144 may be further configured to maintain backpressure on the primary heat exchanger 136 such that vapor bubbles do not form in the primary heat exchanger 136, helping to prevent cavitation, wear, and fouling of the heat exchanger. In one embodiment, the orifice 144 may be a valve controlled by the controller 114, and/or set manually, to provide a designed and/or controlled back pressure on the heated recirculation stream 134.

The heat transfer of the primary heat exchanger 136 is further enhanced by high flow rates of the recirculation stream 132. Using plate-frame heat exchanger elements, and using a shell and tube heat exchanger, recirculation rates above 200× (i.e. mass flow of recirculation stream 132 is 200 times the mass flow of the distillate stream 143) economically improve the heat transfer in the primary heat exchanger 136. In other words, the additional pumping losses incurred by increasing the flow rate are lower than the additional capital costs required to purchase a larger primary heat exchanger. Increasing recirculation rates generally improve the system 100 up to about 300×, although in primary heat exchangers 136 that must be constructed with exotic materials (e.g. titanium alloys, porcelain enamels, etc.), for example due to highly corrosive impurities, the recirculation rates may be economically set even higher to save capital costs. Also, recirculation rates may be economically higher when the size of the system 100 is at a premium—for example a system 100 installed on an offshore drilling platform or a system 100 designed to fit on a standard commercial vehicle.

The evaporation unit 141 accepts the flashed heated recirculation stream 134, and has a liquid bottoms to supply the concentrated bottoms stream 130, and a distillate stream 143. The distillate stream 143 will be largely water, and will further include any components of the feed stream 112 that have a volatility near or greater than water. A blower 142 may draw the vapors off of the evaporation unit 141, and send the charged distillate stream 146 through the primary heat exchanger 136. The charged distillate stream 146 leaves the primary heat exchanger 136 as a condensed distillate stream 148.

The system 100 may include a steam-stripping system 147 that strips volatile and non-condensable impurities from the condensed distillate stream 148, and creates a stripped product stream 150A that is ready for final processing. The steam-stripping system 147 includes a stripping vessel 152 that accepts the condensed distillate stream 148, and has a stripper bottoms stream 154. A stripper recycle pump 156 recycles the bottoms stream 154 through a reboiler 160, which may be a heat exchanger using a stripper steam inlet 158 taken from the system steam inlet 137 (and/or other heated medium as described above) to heat the bottoms stream 154. In one embodiment, direct steam injection or other heating methods are utilized to heat the bottoms stream 154.

The reboiler 160 heats the bottoms stream 154 to a temperature above the boiling point for target impurities in the condensed distillate stream 148, but below the boiling point for water. In one embodiment, the reboiler 160 heats the condensed distillate stream 148 to a temperature just below the boiling point for water. The selection of the temperature for the heated bottoms 162 is an economic decision based on the required water purity of the purified product stream 150D, the cost of steam or available heat source, the target impurities, and similar parameters that vary for specific embodiments of the steam-stripping system 147. It is within the skill of one in the art to determine an economic heated bottoms 162 temperature based on the disclosures herein. The heated bottoms stream 162 is reinjected into the stripping vessel 152, driving volatiles and organic fractions out the top in a stripper vapor outlet 164. The spent steam exits the system 100 as a cooled steam outlet 140.

The steam inlet stream 138 may be a small temperature offset (e.g. +/−10° F. offset) above the temperature of the heated recirculation stream 134, while the steam return stream 140 may be at about the temperature of the heated recirculation stream 134. For example, the steam inlet stream 138 may be 250° F. while the recirculation stream 132 may be 235° F. The temperature offset allows the primary heat exchanger to remain in an efficient heat transfer regime.

The stripper vapor outlet 164 passes to a condensing system 166, which divides the stripper vapor outlet 164 into a volatile fraction stream 168, a non-condensable stream 170, and a stripper reflux stream 172. A reflux ratio is defined as the mass flow rate of the stripper reflux stream 172 divided by the sum of the mass flow rates of the volatile fraction stream 168 and the non-condensable stream 170. The reflux ratio may vary with the amount of separation required (e.g. the organic fraction of impurities), the size of the stripping vessel 152, the temperatures of the various streams 148, 154, 162, 164, and the boiling points of the various components in the condensed distillate stream 148. Typically, a reflux ratio between about 0.5 and 20.0 will suffice to achieve an acceptably purified stripped product stream 150A. In other embodiments, various cost considerations may drive a higher or lower reflux ratio. For example where recovery of a valuable volatile fraction from the condensed distillate stream 148 is a primary goal, a reflux ratio higher than 20.0 may be economically desirable. In another example, where a volatile fraction has a much higher vapor pressure than water, a lower reflux ratio may suffice.

The stripped product stream 150A may enter an oxidizer unit 174 to remove final traces of alcohols, soluble oils, phenols, and/or any other contaminants. The oxidizer unit 174 may oxidize the stripped product stream 150A via chemical (e.g. peroxide, bleach, ozone, etc.) and/or ultraviolet means, and the oxidizer unit 174 may include a sonic and/or ultrasonic vibration source to enhance the oxidization. The oxidized product stream 150B may be passed through the secondary recovery heat exchanger 123 to return remaining heat from the steam-stripping system 147 to the feed stream 112. In one embodiment, the oxidized product stream 150B may utilize a separate heat exchanger (not shown) from the heat exchanger 123 utilized by the pre-recovery concentrated purge stream 124. The post-secondary heat recovery stream 150C may be passed through a final processing unit 176, for example a carbon adsorber, before discharge as a purified product stream 150D. The stripped product stream 150A may pass through an oxidizer unit 174, the secondary recovery heat exchanger 123, and/or the final processing unit 176 in any order, and some or all of these components may be present in a given embodiment of the present invention.

The flows, temperatures, pressures, and other parameters of the various streams in the system 100 vary according to the application and may be controlled by the controller 114. In one example, the waste fluid stream 104 flows between 2 and 70 gallons per minute (gpm), and is limited primarily by the capacity of the evaporation unit(s) 141. The purified product stream 150D flow rate depends upon the required final purity of the stream and the concentration of impurities in the waste fluid stream 104, but will typically be a flow rate about 90% of the waste fluid stream 104. The concentrated purge stream 120 will be the remainder of the waste fluid stream 104, less the volatile fraction stream 168 and the non-condensable stream 170. The controller 114 may control the concentrated purge stream 120 to a temperature selected for safe handling (e.g. 140° F.), and/or for other concerns downstream such as the cooling capacity of a waste handling system (not shown).

The pre-recovery concentrated purge stream 124 may be controlled to 230-240° F., and this temperature may be selected according to the specifications of the primary heat exchanger 136 and/or the secondary recovery heat exchanger 123. The recirculation pump 128 may operate at about 2-15 psig on the suction side (pre-heated feed stream 122) and 25-55 psig on the discharge side (recirculation stream 132).

The controller 114 may control the amount of the pre-recovery concentrated purge stream 124 to keep the desired concentration in the concentrated purge stream 120. For example, the waste fluid stream 104 may include 1,000 ppm impurities, and the controller 114 may control the pre-recovery concentrated purge stream 124 to 50,000 ppm impurities. In the example, ignoring the volatile fraction stream 168 and the non-condensable stream 170, at steady state with a waste fluid stream 104 of 100 gpm, the concentrated purge stream 120 would be about 2 gpm, while the purified product stream 150D would be about 98 gpm. The controller 114 may utilize varying concentrations, temperatures, and/or flow targets during transient operations such as system 100 startup, concentration variations in the waste fluid stream 104, and the like.

In one embodiment, the concentration of the concentrated bottoms stream 130, which controls the concentration of the concentrated purge stream 120, may be limited by the solubility of the impurities in water. For example, the upper limit of certain salt concentrations may be 200,000 to 400,000 ppm or greater according to the solubility limit of the particular salt. The type of impurity and the concentration of the pre-recovery concentrated purge stream 124 depend upon the application of the system 100. The final concentration of the pre-recovery concentrated purge stream 124 may be limited by the pumpability of the pre-recovery concentrated purge stream 124, and therefore any concentration up to saturation and even a little beyond (e.g. if solids are present but in a pumpable suspension) may be utilized depending upon the application.

In one embodiment, the concentration of the concentrated bottoms stream 130 may be selected according to the utilization of the concentrated purge stream 120 as an intended product. For example, the concentrated purge stream 120 may be utilized as a 4% KCl solution, and the controller 114 may control the concentration of the concentrated bottoms stream 130 such that the concentrated purge stream 120 exits the system 100 as a 4% KCl solution.

The blower 142 moves the vapor from the evaporation unit 141 through the primary heat exchanger 136. In one example, the blower 142 operates at about 5-15 psig on the suction side (i.e. the distillate stream 143) and about 7-25 psig on the discharge side (i.e. the charged distillate stream 146). The distillate stream 143 may be de-superheated (i.e. cooled to the dew point but still steam) by a heat exchanger (not shown) just before the blower 142, or at any other logical location within the system 100 including after the blower 142. The de-superheating may be performed by cooling water (not shown), by heat exchange with the feed stream 112, the pre-recovery concentrated purge stream 124, and/or another stream in the system 100. The charged distillate stream 146 enters the primary heat exchanger 136 at approximately the temperature of the dew point of the charged distillate stream 146. The condensed distillate stream 148 exits the primary heat exchanger 136 at a temperature offset above the recirculation stream 132 temperature—for example about 2-3° F. above the recirculation stream 132 temperature and/or just at or below the boiling point of the condensed distillate stream 148. In one embodiment, the blower 142 is a disc flow turbine (i.e. a "Tesla turbine") run as a pump, with work flowing from the shaft to the distillate stream 143.

In one embodiment, the system 100 includes a steam control unit 180. The steam control unit 180 provides backpressure to keep the condensed distillate stream 148 in a liquid phase and to provide condensed steam to the stripping vessel 152. The steam control unit 180 may comprise a steam trap (refer to the description referencing FIG. 3A) or other steam control device (for example, refer to the description referencing FIG. 3B). The steam control unit 180 may further comprise a pump that delivers the condensed distillate stream 148 to the stripping vessel 152.

In one embodiment, the controller 114 is configured to operate the system 100 at a pressure slightly higher than atmospheric pressure. For example, the blower 142 may run at 5 psig on the suction side and 10 psig at the discharge side nominally, and the controller 114 may increase the pressure to 10 psig and 20 psig respectively under some conditions. Other pressures in the system 100 may likewise be increased, for example the pressures in the evaporation unit 141 and the stripping vessel 152. In one embodiment, the capacity of the system 100 in terms of the waste fluid stream 104 mass that can be accepted increases by about 5% for each one psi increase of the system 100 pressure. Therefore, the controller 114 can configure the system 100 capacity to a requirement of an application and/or for other reasons. For example, applications may include multiple purification systems 100, and one or more of the systems 100 may be shut down for maintenance. In the example, the controller 114 may increase the operating pressure for on-line systems 100 during the maintenance shutdown. Other uses of a configurable waste fluid stream 104 capacity are understood by one of skill in the art and contemplated within the scope of the present invention.

In one embodiment, the system 100 further includes an additives unit 182 that allows additives to be mixed into the recirculation stream 132. The location of the additives unit 182 in FIG. 1 is for example only, and the additives unit 182 may be placed anywhere in the recirculation from the concentrated bottoms stream 130 to the heated recirculation stream 134. The system 100 may further include an additives pump 184 that delivers additives to the additives unit 182. Additives may include anti-foaming agents, anti-corrosion agents, and/or another type of additive that may be beneficial for a given embodiment of the system 100.

Figure 2:
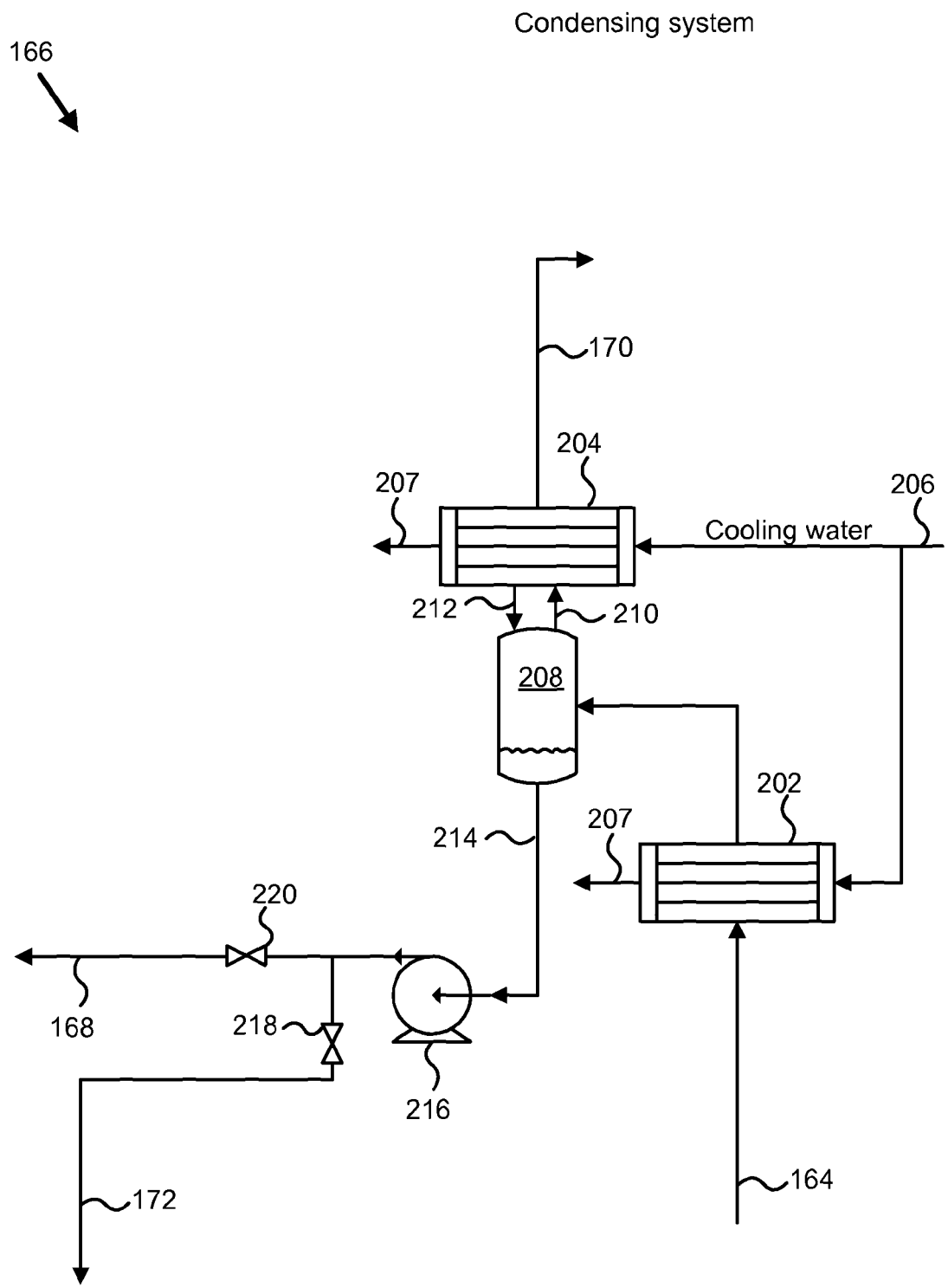
FIG. 2 is a schematic block diagram illustrating one embodiment of a condensing system in accordance with to the present invention.

FIG. 2 is a schematic block diagram illustrating one embodiment of a condensing system 166 in accordance with the present invention. The condensing system 166 includes a pair of condensers 202, 204 accepting cooling water 206 from a water supply, and discharging spent water 207 out of the condensing system 166. A primary condenser 202 cools the stripper vapor outlet 164, sending the condensed fluid to a collection vessel 208. A collection vapor stream 210 goes to a secondary condenser 204 where the vapors leave as a non-condensable stream 170, and the liquid 212 is returned to the collection vessel 208. The liquid from the collection vessel 208 exits as a condensed stream 214, where a pump 216 may deliver it out of the condensing system 166.

One or more valves 218, 220 may control the liquid output from the condensing system 166, sending some liquid out as the volatile fraction stream 168, and returning a portion of the liquid to the stripping vessel 152 as the stripper reflux stream 172. Methanol and light oils that may not be separated from water in the separation unit 126 may typically be included in the volatile fraction stream 168. Other volatile compounds may be present in the volatile fraction stream 168 depending upon the impurities in the feed stream 112.

Figure 3A:
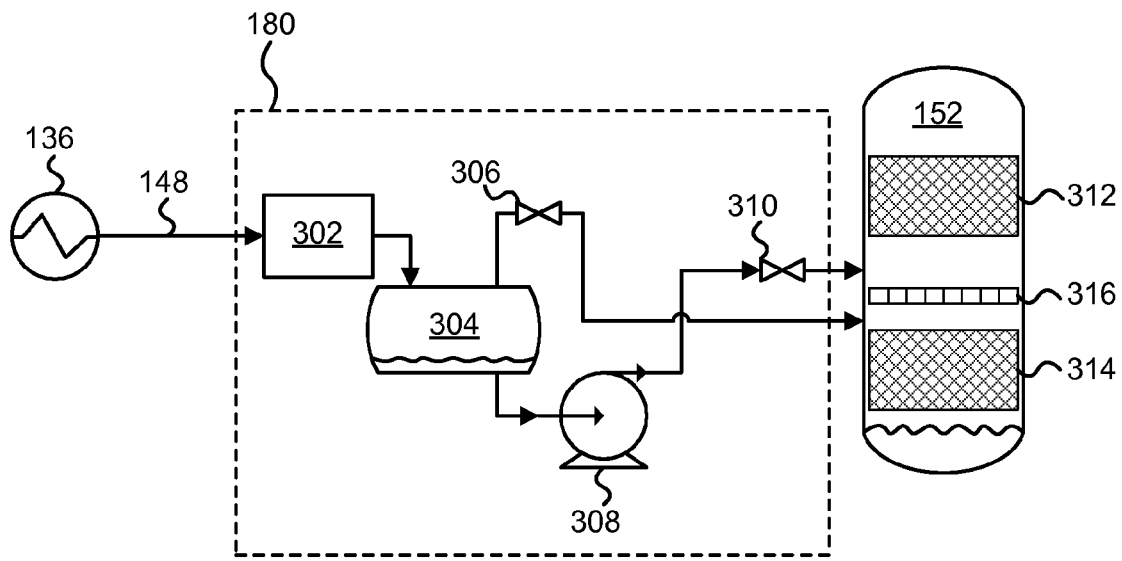
FIG. 3A is a schematic block diagram illustrating one embodiment of a steam control unit in accordance with the present invention.

FIG. 3A is a schematic block diagram illustrating one embodiment of a steam control unit 180 in accordance with the present invention. The steam control unit 180 includes a steam trap 302 that maintains pressure on the condensed distillate stream 148 and passes condensate to a storage vessel 304. The storage vessel may have a vent 306 that releases excess pressure from the storage vessel 304, for example to the steam stripper 152 below a distribution tray 316. A pump 308 may deliver liquid in the storage vessel 304 through a level control valve 310 to provide the condensed distillate stream 148 to the stripping vessel 152. The stripping vessel 152 may include a distribution tray 316, an upper packed bed portion 312, and a lower packed bed portion 314. The stripping vessel 152 may alternatively comprise contact trays (not shown) and/or other mechanisms known in the art to provide surface area for a rising vapor to contact a falling liquid in the stripping vessel 152. The order of the pump 308 and level control valve 310 may vary depending upon the specific embodiment of the invention. The vapor from the storage vessel 304 may be delivered to the stripping vessel 152 as shown in FIG. 3A, or may alternatively be vented and/or delivered to another portion of the system 100.

Figure 3B:
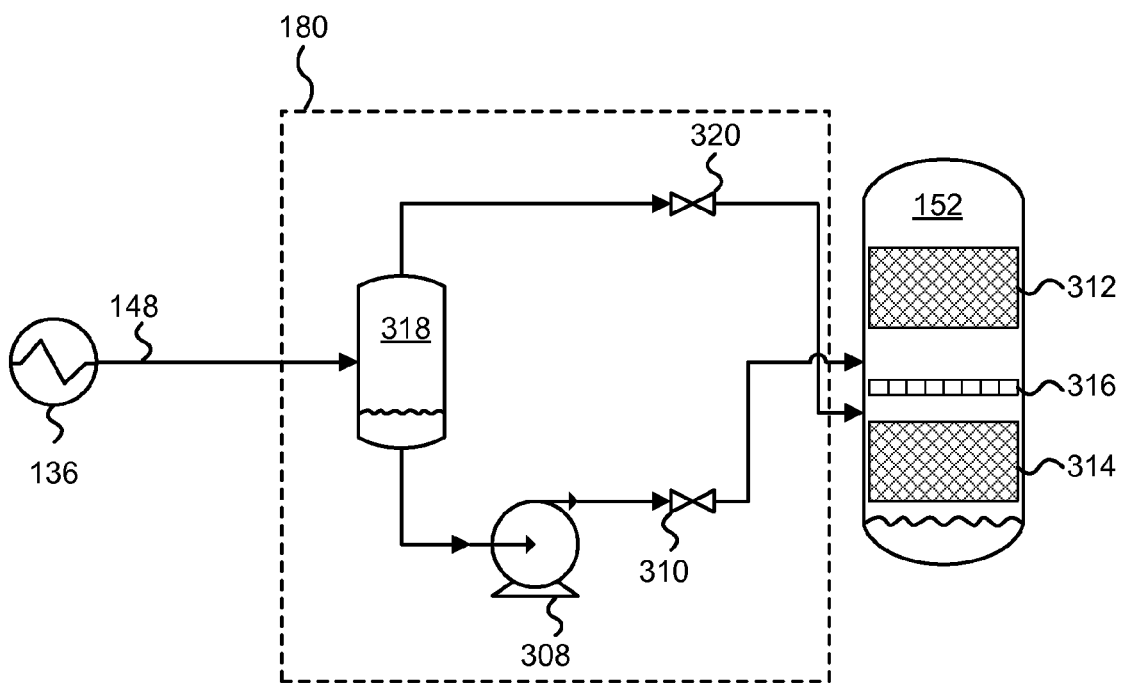
FIG. 3B is a schematic block diagram illustrating an alternate embodiment of a steam control unit in accordance with the present invention.

FIG. 3B is a schematic block diagram illustrating an alternate embodiment of a steam control unit 180 in accordance with the present invention. The steam control unit 180 includes a separator 318 that separates a vapor fraction from a liquid fraction of the condensed distillate stream 148. The vapor fraction passes through a pressure control valve 320 into the stripping vessel 152. The liquid fraction is delivered by a pump 308 through a level control valve 310 and supplied to the stripping vessel 152. In the example illustrated in FIG. 3B, the vapor portion may insert below a distribution tray 316 and the liquid portion may insert above the distribution tray 316 to enable better distribution of the liquid and vapor in the stripping vessel 152. The stripping vessel 152 may include a distribution tray 316, an upper packed bed portion 312, and a lower packed bed portion 314. The stripping vessel 152 may alternatively comprise contact trays (not shown) and/or other mechanisms known in the art to provide surface area for a rising vapor to contact a falling liquid in the stripping vessel 152. The order of the pump 308 and level control valve 310 may vary depending upon the specific embodiment of the invention. The vapor from the separator 318 may be delivered to the stripping vessel 152 as shown in FIG. 3B, or may alternatively be vented and/or delivered to another portion of the system 100.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
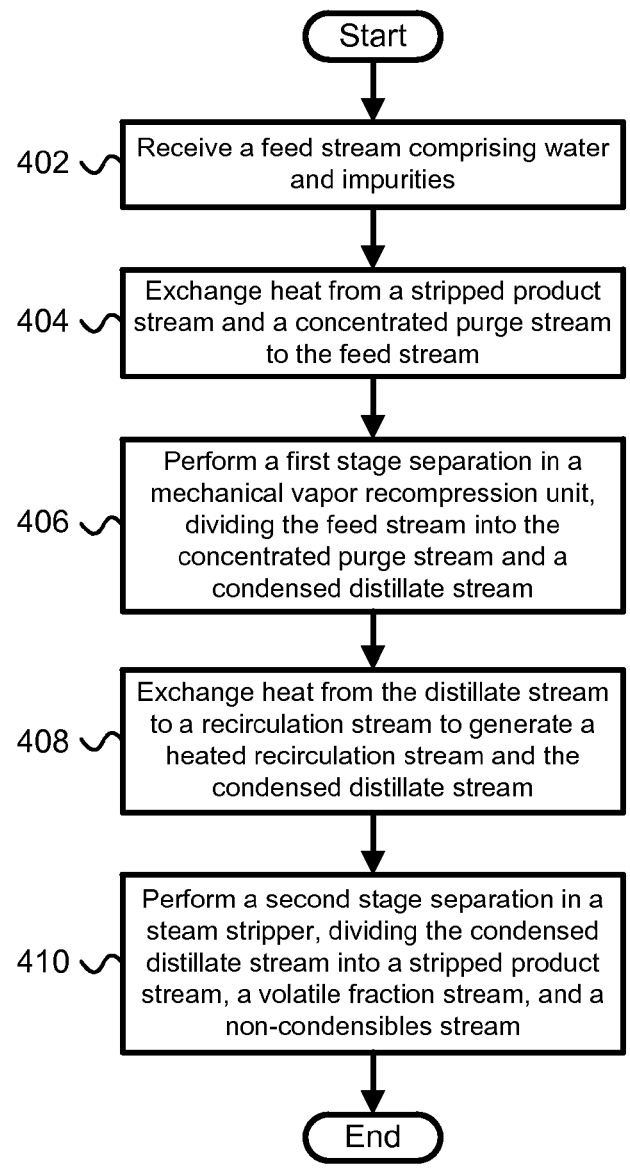
FIG. 4 is a schematic flow chart diagram illustrating an embodiment of a method for purifying a waste stream in accordance with the present invention.

FIG. 4 is a schematic flow chart diagram illustrating an embodiment of a method 400 for purifying a waste stream in accordance with the present invention. The method includes a secondary recovery heat exchanger 123 receiving 402 a feed stream 112, and exchanging 404 heat from a pre-recovery concentrated purge stream 124 to the feed stream 112. The method 400 further includes a separation unit 126 performing 406 a first stage separation in a mechanical vapor recompression unit, dividing the feed stream 112 into the pre-recovery concentrated purge stream 124 and a condensed distillate stream 148. The method 400 further includes a primary heat exchanger 136 exchanging 408 heat from the distillate stream 143 to a recirculation stream 132 to generate a heated recirculation stream 134 and the condensed distillate stream 148. The method 400 further includes performing 410 a second stage separation in a steam-stripping system 147, dividing the condensed distillate stream 148 into a stripped product stream 150A, a volatile fraction stream 168, and a non-condensable stream 170a.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to purify a waste fluid stream, the system comprising:
    a recirculation pump having an inlet for a recirculation stream and an outlet to expel a pressurized stream, the recirculation stream comprising a waste fluid stream and a recycled liquid bottoms stream;
    a compressor having an inlet for an evaporation stream and an outlet for a pressurized evaporation stream;
    a primary heat exchanger having inlets for the pressurized stream and the pressurized evaporation stream, having an internal surface area for heat transfer from the evaporation stream to the pressurized stream, and having outlets for a cooled evaporation stream and a heated pressurized stream, wherein
        the heated pressurized stream is formed by heating the pressurized stream, and
        the cooled evaporation stream is formed by cooling the evaporation stream; and an evaporation unit having an inlet for the heated pressurized stream and outlets for the evaporation stream and the recycled liquid bottoms stream, wherein
the evaporation stream is formed when volatile compounds in the heated pressurized stream evaporate in the evaporation unit, and
the liquid bottoms stream is formed from a portion of the heated pressurized stream that does not evaporate.

2. The system of claim 1, further comprising a stripping unit that receives the cooled evaporation stream from the primary heat exchanger, the stripping unit comprising a stripping vessel, a stripper recycle pump, a reboiler, a condensing unit, and at least one valve, wherein:
the stripping vessel comprises inlets for the cooled evaporation stream, a recycled bottoms stream, and a stripper reflux stream and outlets for a stripper vapor outlet stream and a stripper bottoms stream;
the stripper recycle pump comprises an inlet for the stripper bottoms stream and an outlet for the recycled bottoms stream;
the reboiler comprises inlets for the recycled bottoms stream and a heat transfer fluid, the reboiler having an internal surface area for heat transfer from the heat transfer fluid to the recycled bottoms stream;
the condensing unit comprises an inlet for the stripper vapor outlet stream and outlets for a volatile fractions stream, a non-condensable stream, and the stripper reflux stream, wherein the stripper reflux stream returns to the stripping vessel; and
the at least one valve comprises an inlet for the recycled bottoms stream and at least two outlets, wherein one outlet comprises a final product stream port.

3. The system of claim 2, wherein the condensing unit comprises:
a primary condenser having inlets for the stripper vapor outlet stream and a first coolant stream, having an internal surface area for heat transfer from the stripper vapor outlet stream to the coolant stream, and having outlets for a cooled stripper vapor stream and a spent coolant stream;
a collection vessel having inlets for the cooled stripper vapor stream and a liquid return stream and having outlets for a collection vapor stream and a condensed stream;
a secondary condenser having inlets for the collection vapor stream and a second coolant stream, having an internal surface area for heat transfer from the collection vapor stream to the second coolant stream, and having outlets for a non-condensable stream, the liquid return stream, and a spent coolant stream, wherein
the liquid return stream comprises a fraction of the collection vapor stream that condenses in the secondary condenser, and
the non-condensable stream comprises a fraction of the collection vapor stream that does not condense in the secondary condenser; and
a splitter valve having an inlet for the condensed stream and outlets for the stripper reflux stream and the volatile fractions stream.

4. The system of claim 2, wherein the ratio of the flow rate of the stripper reflux stream to the sum of the flow rates of the volatile fraction stream and the non-condensable stream is between 1 and 200.

5. The system of claim 2, wherein the ratio of the flow rate of the stripper reflux stream to the sum of the flow rates of the volatile fraction stream and the non-condensable stream is between 10 and 50.

6. The system of claim 2, wherein the ratio of the flow rate of the stripper reflux stream to the sum of the flow rates of the volatile fraction stream and the non-condensable stream is approximately 20.

7. The system of claim 2 further comprising a steam control unit that provides backpressure to keep the cooled evaporation stream in a liquid phase, the steam control unit comprising:
a separator having an inlet for the cooled evaporation stream from the primary heat exchanger and a outlets for a liquid stream and a vapor vent stream;
a pump having an inlet for the liquid stream and an outlet to the stripping unit; and
a vent having an inlet for the vapor vent stream and an outlet to the stripping unit.

8. The system of claim 7 wherein the steam control unit provides the liquid stream to the stripping vessel and wherein the vapor vent stream is introduced to the stripping vessel below a distribution tray.

9. The system of claim 2, further comprising a steam control unit that provides backpressure to keep the cooled evaporation stream in a liquid phase, the steam control unit comprising:
a steam trap having an inlet for the cooled evaporation stream from the primary heat exchanger and an outlet for a condensed distillate stream;
a storage vessel having an inlet for the condensed distillate stream and outlets for a vapor vent stream and a liquid stream;
a pump having an inlet for the liquid stream and an outlet to the stripping unit; and
a vent having an inlet for the vapor vent stream and an outlet to the stripping unit.

10. The system of claim 9 wherein the steam control unit provides condensed steam to the stripping vessel and wherein the vapor vent stream from the storage vessel is introduced to the stripping vessel below a distribution tray.

11. The system of claim 1 further comprising an oxidizer unit, wherein the oxidizer unit comprises:
inlets for a product stream and an oxidizer;
an outlet for an oxidized stream; and
an ultrasonic vibration source.

12. The system of claim 1 further comprising an oxidizer unit, wherein the oxidizer unit comprises:
an inlet for a product stream;
an outlet for an oxidized stream; and
an ultraviolet radiation source.

13. The system of claim 1 further comprising a secondary recovery heat exchanger having inlets for the waste fluid stream and a final product stream, having an internal surface area for heat transfer from the final product stream to the waste fluid stream, and having outlets for a cooled final product stream and a heated waste fluid stream.

14. The system of claim 1 further comprising an additives unit, the additives unit comprising a pump having an inlet for additives and an outlet to the recirculation stream.

15. The system of claim 1 wherein the primary heat exchanger is further configured with an inlet and an outlet for a heat transfer fluid and with an internal surface area for heat transfer from the heat transfer fluid to the pressurized stream.

16. The system of claim 1, wherein the primary heat exchanger transfers heat from the evaporation stream to the recirculation stream such that the cooled evaporation stream is a liquid.

17. The system of claim 1 further comprising a secondary recovery heat exchanger having inlets for the waste fluid stream and a purge stream, having an internal surface area for heat transfer from the purge stream to the waste fluid stream, and having outlets for a cooled purge stream and a heated waste fluid stream.

18. The system of claim 1 further comprising an orifice through which the heated pressurized stream flows prior to entering the evaporation unit, the orifice being configured to enhance a flash effect of the heated pressurized stream within the evaporation unit.

19. The system of claim 1 wherein a ratio of the mass flow rate of the recirculation stream to the mass flow rate of the evaporation stream is greater than about 200.

20. The system of claim 1, further comprising a separator that removes solid material and hydrocarbons immiscible in water from the waste fluid stream before the waste fluid stream joins the recirculation stream.

21. The system of claim 20, further comprising a feed pump to deliver the waste fluid stream to the separator.

22. The system of claim 1, further comprising a final processing unit configured to remove remaining contaminants from the final product stream.

23. The system of claim 22, wherein the final processing unit comprises a carbon adsorber.

24. The system of claim 1, further comprising a controller that receives one or more signals from sensors and sends one or more signals to actuators.

25. The system of claim 24, wherein the sensors measure parameters selected from the group consisting of pressure, temperature, level, flow, density, and chemical composition.

26. The system of claim 24, wherein the actuators are selected from the group consisting of electronic, hydraulic, and pneumatic manipulation of controlled physical components of the apparatus.

27. The system of claim 24, wherein the controlled physical components of the apparatus are selected from the group consisting of valves, pumps, and blowers.

28. The system of claim 24, wherein the controller comprises an operator interface.

29. The system of claim 1, wherein the waste fluid stream is contaminated oilfield process water.

30. The system of claim 1, wherein the ratio of the flow rate of the recirculation stream to the flow rate of the waste fluid stream is between 50 and 500.

31. The system of claim 1, wherein the ratio of the flow rate of the recirculation stream to the flow rate of the waste fluid stream is between 150 and 250.

32. The system of claim 1, wherein the ratio of the flow rate of the recirculation stream to the flow rate of the waste fluid stream is approximately 200.

33. A system to purify a waste fluid stream, the system comprising:
a recirculation pump having an inlet for a recirculation stream and an outlet to expel a pressurized stream, the recirculation stream comprising a waste fluid stream and a recycled liquid bottoms stream;
a compressor having an inlet for an evaporation stream and an outlet for a pressurized evaporation stream;
a primary heat exchanger having inlets for the pressurized stream, the pressurized evaporation stream, and a heat transfer fluid, the heat exchanger transferring heat from the heat transfer fluid and from the evaporation stream to the pressurized stream;
an evaporation unit having an inlet for the pressurized stream and outlets for the evaporation stream and the recycled liquid bottoms stream;
a stripping vessel having inlets for the evaporation stream, a recycled bottoms stream, and a stripper reflux stream and outlets for a stripper vapor outlet stream and a stripper bottoms stream;
a stripper recycle pump having an inlet for the stripper bottoms stream and an outlet for the recycled bottoms stream;
a reboiler having inlets for the recycled bottoms stream and a heat transfer fluid, the reboiler having an internal surface area for heat transfer from the heat transfer fluid to the recycled bottoms stream;
a condensing unit having an inlet for the stripper vapor outlet stream and outlets for a volatile fractions stream, a non-condensable stream, and the stripper reflux stream, wherein the stripper reflux stream returns to the stripping vessel;
a secondary recovery heat exchanger having inlets for the waste fluid stream and the final product stream, the heat exchanger transferring heat from the final product stream to the waste fluid stream.

34. A method to purify a waste fluid stream, the method comprising:
joining a waste fluid stream with a concentrated bottoms stream from an evaporation unit to form a pressurized stream;
recirculating the pressurized stream through a primary heat exchanger and the evaporation unit;
transferring heat from a compressed evaporation stream to the pressurized stream to form a heated pressurized stream; and
evaporating volatile compounds from the heated pressurized stream in the evaporation unit and passing the volatile compounds through a compressor to become the compressed evaporation stream, the volatile compounds forming the evaporation stream;
wherein the concentrated bottoms stream comprises a portion of the heated pressurized stream that does not evaporate.

35. The method of claim 34, further comprising:
introducing the evaporation stream into a stripping vessel, wherein the evaporation stream separates into a vapor outlet stream and a liquid bottoms stream;
pumping the stripper bottoms stream from the stripping vessel through a reboiler and back to the stripping vessel;
extracting a portion of the stripper bottoms stream as a product stream;
heating the stripper bottoms stream in the reboiler;
condensing a portion of the vapor outlet stream to form a stripper reflux stream; and
returning the stripper reflux stream to the stripping vessel.

36. The method of claim 35 further comprising mixing a chemical oxidizer with the product stream.

37. The method of claim 36 further comprising vibrating a mixture of the chemical oxidizer and the product stream with ultrasonic vibration.

38. The method of claim 35 further comprising irradiating the product stream with ultraviolet radiation.

39. The method of claim 35 further comprising removing contaminants from the product stream by passing the product stream through a filter.

40. The method of claim 35, further comprising transferring heat from the product stream to the waste fluid stream.

41. The method of claim 34, further comprising adding chemical additives to the pressurized stream.

42. The method of claim 34, further comprising transferring heat from a heat transfer fluid to the pressurized stream.

43. The method of claim 34, further comprising separating solid material and hydrocarbons immiscible in water from the waste fluid stream before the waste fluid stream joins the pressurized stream.

44. The method of claim 34, further comprising:
receiving one or more signals from sensors; and
controlling one or more actuators.

45. The method of claim 44, wherein the sensors measure parameters selected from the group consisting of pressure, temperature, level, flow, density, and chemical composition.

46. The method of claim 44, wherein the actuators are selected from the group consisting of electronic, hydraulic, and pneumatic manipulation of controlled physical components of the apparatus.

47. The method of claim 46, wherein the controlled physical components of the apparatus are selected from the group consisting of valves, pumps, and blowers.

* * * * *

UNITED STATES PATENT AND TRADEMARK OFFICE
CERTIFICATE OF CORRECTION

| | |
|---|---|
| PATENT NO. | : 7,837,768 B2 |
| APPLICATION NO. | : 12/199777 |
| DATED | : November 23, 2010 |
| INVENTOR(S) | : Larry D. Sanderson et al. |

It is certified that error appears in the above-identified patent and that said Letters Patent is hereby corrected as shown below:

Column 1, Line 29
    "cannot simply dumped"---should read "cannot simply be dumped"

Column 3, Line 22
    "and a outlets"---should read "and outlets"

Column 5, Line 47
    "of an system"---should read "of a system"

Column 5, Line 50-51
    "accordance with to the"---should read "accordance with the"

Column 9, Line 1-2
    "recirculation system have"---should read "recirculation systems have"

Column 16, Line 10
    "and a outlets"---should read "and outlets"

Signed and Sealed this
Twenty-second Day of February, 2011

David J. Kappos
*Director of the United States Patent and Trademark Office*